(12) United States Patent
Smit (10) Patent No.: US 9,650,116 B2
(45) Date of Patent: May 16, 2017

(54) MOUNTING SYSTEM AND ASSOCIATED APPARATUS

(71) Applicant: Andre Smit, Raleigh, NC (US)

(72) Inventor: Andre Smit, Raleigh, NC (US)

( * ) Notice: Subject to any disclaimer, the term of this patent is extended or adjusted under 35 U.S.C. 154(b) by 0 days.

(21) Appl. No.: 14/680,733

(22) Filed: Apr. 7, 2015

(65) Prior Publication Data
US 2016/0297503 A1  Oct. 13, 2016

(51) Int. Cl.
*A47B 96/00* (2006.01)
*B63B 35/85* (2006.01)
*B63B 35/71* (2006.01)
*B01D 53/04* (2006.01)
*C10L 3/10* (2006.01)

(52) U.S. Cl.
CPC .......... *B63B 35/85* (2013.01); *B01D 53/0462* (2013.01); *B63B 35/71* (2013.01); *C10L 3/104* (2013.01); *C10L 3/106* (2013.01); *B01D 2253/108* (2013.01); *B01D 2253/116* (2013.01); *B01D 2256/245* (2013.01); *B01D 2257/504* (2013.01); *B01D 2257/80* (2013.01); *B63B 2035/715* (2013.01); *C10L 2290/542* (2013.01)

(58) Field of Classification Search
CPC ................................ B23Q 1/48; A47F 5/0846
USPC ....................... 248/225.11, 223.41, 503, 307; 410/104–105
See application file for complete search history.

(56) References Cited

U.S. PATENT DOCUMENTS

| 4,915,342 A * | 4/1990 | Nilsson | B21D 1/145 |
| | | | 248/225.11 |
| 2007/0094955 A1* | 5/2007 | Safford | E04B 2/885 |
| | | | 52/204.5 |

* cited by examiner

*Primary Examiner* — Christopher E Garft (57) ABSTRACT

A mounting system is provided. Such a system includes at least one "C" channel adapted to be mounted to a surface, and a mountable accessory device. An intermediary mounting member is disposed between the at least one "C" channel and the accessory device, and the intermediary mounting member has the accessory device mounted thereto. At least two mounting arrangements are also included, wherein each mounting arrangement is engaged between one of the at least one "C" channel and the intermediary mounting member, and wherein the mounting arrangements are disposed in spaced-apart relation along the at least one "C" channel. An associated apparatus is also provided.

6 Claims, 6 Drawing Sheets

MOUNTING SYSTEM AND ASSOCIATED APPARATUS

BACKGROUND

Field of the Disclosure

Aspects of the present disclosure are directed to mounting systems and, more particularly, to mounting systems and associated apparatuses, for example, for surface-mounted accessories for watercraft such as, for instance, fishing kayaks.

Description of Related Art

Some modern watercraft, such as kayaks, particularly fishing kayaks, are constructed and comprised of a molded polymer. In some instances, the kayak may be configured as a "sit-on" kayak, wherein the molded polymer hull forms an enclosed chamber and the user sits in or on a molded depression formed on an upper surface of the hull. The enclosed chamber of the molded hull further functions as an air pocket providing flotation for the watercraft. As such, it is generally desirable to limit water intrusion into the enclosed chamber.

Particular accessories for kayaks such as, for example, rod holders for fishing rods, are generally configured as a tube extending from a rod butt-receiving end for receiving the butt of the fishing rod therein. In some instances, rod holders can be mounted with the rod butt-receiving end flush with the surface through which the tube extends. However, even if sealed, the interface between the rod butt-receiving end and the surface through which the tube extends may be at risk of leaking water into the hull. Further, the end of the tube opposite the rod butt-receiving end can either be open or sealed. However, if the end is open, water may flow freely into the hull. If the end is closed, water may become trapped in the tube, which is generally not desirable. As such, in some instances, rod holders may be configured such that the end opposite to the rod butt-receiving end is implemented to mount the rod holder to the kayak.

Figure 1A:
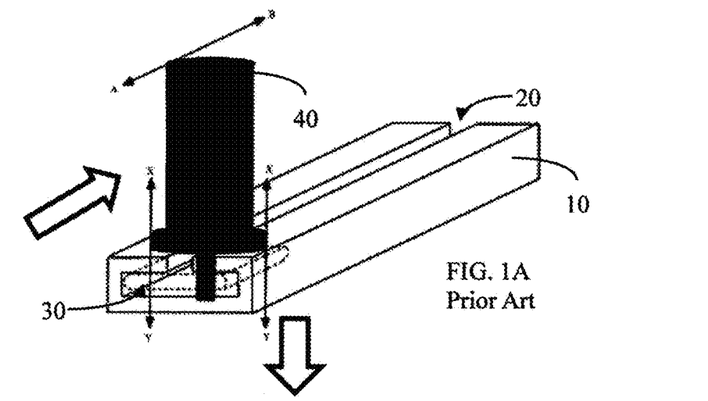
FIGS. 1A-1C schematically illustrate perspective views of a prior art rail or "C" channel mounting system for an accessory device.
Figure 1B:
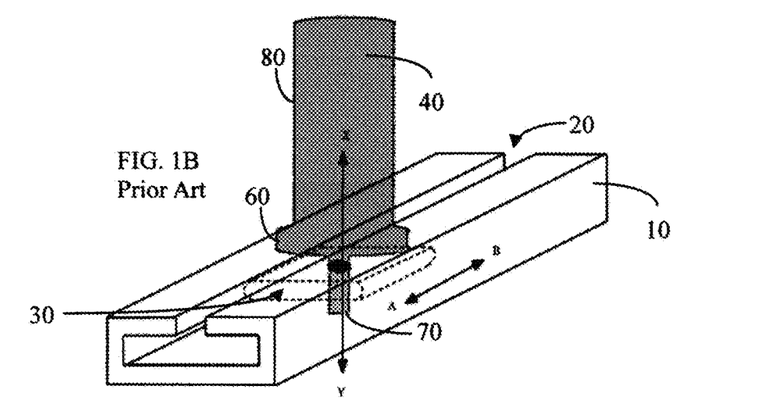
Figure 1C:
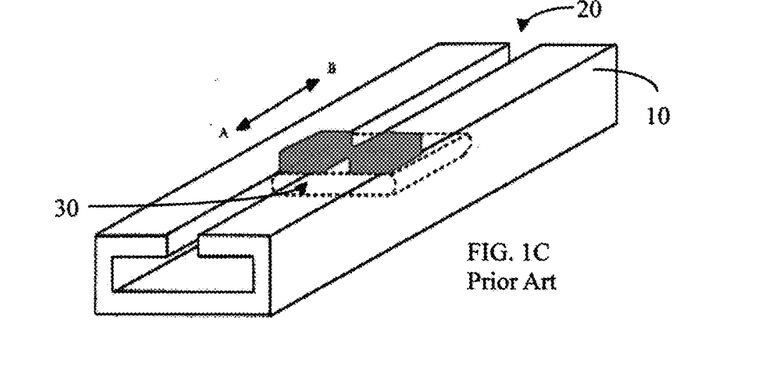

In some prior art mounting systems for kayak accessories, as shown, for example, in FIGS. 1A-1C, a "C" channel (also referred to herein as a "rail" or "track") element 10 is mounted to a surface of the kayak hull such that the opening 20 in the "C" channel 10 is directed away or outwardly of the surface. A nut, a head of a bolt, or a backing plate 30 may then be inserted into the track such that the threaded portion thereof aligns with the opening 20 in the "C" channel 10. The mountable accessory 40 may thus include a threaded extension or a nut, respectively, configured to engage the complementary portion 30 inserted into the "C" channel" 10, wherein engagement therebetween secures the accessory 40 to the "C" channel 10. More particularly, in such instances, engaging the complementary portions of the fastener secures the portions of the "C" channel 10 on either side of the opening 20 between the complementary portions so as to secure the accessory 40 to the surface by way of the "C" channel (rail) 10.

However, when mounting certain accessories, such as rod holders, to the kayak in this manner, some limitations may be evident. For example, the rod holder is often mounted to the rail by way of the end of the rod holder opposite to the rod butt-receiving end. Therefore, the rod butt-receiving end is cantilevered with respect to the mounting engagement with the rail. The fishing rods received by the rod holder may then extend several feet from the rod butt. For example, typical fishing rods may extend up to 7 or 8 feet in length. When a fish is hooked on the line running from the fishing rod, a moment arm is exerted on the rod by the fishing line running from the distal end of the rod. As a result, significant force (i.e., due to a torque or a moment generated via the accessory) can be exerted on the "C" channel 10 by the fishing rod, via the rod holder and mount therefor, when a fish is hooked on the fishing rod (i.e., when the fishing rod is placed in the rod holder and the kayak used to troll from fish). In some instances, a "point load" or direct stress (i.e., a relatively large force acting on a relatively small surface area) is created on the "C" channel 10 (see, e.g., FIG. 1C) which, in some instances, may be sufficient to deform or permanently damage the "C" channel 10 such that the fastener portion received by the "C" channel is essentially torn out of the channel. In some cases, the entire rod holder may break or become dismounted from the "C" channel and the rod holder, as well as the fishing rod held thereby, may fall from the kayak into the water and be at risk of becoming lost.

Another desirable characteristic of such a "rail mount" or "C" channel type of mounting system is the flexibility to move the accessory devices along the respective rail or "C" channel to the desired position for the particular user. Accordingly, the accessory devices are desirably mounted to the rail or "C" channel to resist horizontal movement. Typically, however, such resistance to horizontal movement is directly proportional to the tightness of the mounting portion of the accessory device. In some instances, acceptable resistance to horizontal movement may be obtained at the expense of over-tightening the mounting portion of the accessory device which may, in turn cause deformation or other damage to the mounting portion and/or the rail or "C" channel. Therefore, advantages of such a rail or "C" channel mounting system may be nullified.

Thus, there exists a need for a mounting system and associated apparatus form mounting various accessories to a surface, for example, a surface of a polymeric molded kayak, that address and overcome the shortcomings of prior art systems as identified herein.

SUMMARY OF THE DISCLOSURE

The above and other needs are met by aspects of the present disclosure which, in one particular aspect, provides a mounting system, comprising at least one "C" channel adapted to be mounted to a surface, and a mountable accessory device. An intermediary mounting member is disposed between the at least one "C" channel and the accessory device, wherein the intermediary mounting member is configured and arranged to have the accessory device mounted thereto. At least two mounting arrangements are also provided, wherein each mounting arrangement is engaged between one of the at least one "C" channel and the intermediary mounting member, and wherein the mounting arrangements are arranged in spaced-apart relation along the at least one "C" channel.

In another aspect, an apparatus is provided for use with a mounting system including at least one "C" channel adapted to be mounted to a surface and an accessory device mountable to the at least one "C" channel. Such an apparatus comprises a mounting member configured to be arranged between the at least one "C" channel and the accessory device, wherein the mounting member is further configured to receive and have the accessory device mounted thereto. At least two mounting arrangements are provided, wherein each mounting arrangement is configured to be engaged between one of the at least one "C" channel and the mounting member, and wherein the mounting arrangements are arranged in spaced-apart relation along the at least one "C" channel.

Aspects of the present disclosure thus provide a mounting system and associated apparatus for securely mounting accessories, such as fishing rod holders, for example, on watercraft such as kayaks. In some aspects, the disclosed mounting system and associated apparatus may be particularly applicable, for instance, to track- or rail-type mounting arrangements. However, in other aspects, the disclosed mounting system and associated apparatus may be applicable in many different arrangements such as, for example, direct mounting on such watercraft as kayaks or other fishing vessels.

It will be appreciated that the summary herein is provided merely for purposes of summarizing some example aspects so as to provide a basic understanding of the disclosure. As such, it will be appreciated that the above described example aspects are merely examples and should not be construed to narrow the scope or spirit of the disclosure in any way. It will be appreciated that the scope of the disclosure encompasses many potential aspects, some of which will be further described below, in addition to those herein summarized. Further, other aspects and advantages of such aspects disclosed herein will become apparent from the following detailed description taken in conjunction with the accompanying drawings which illustrate, by way of example, the principles of the described aspects.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

Some aspects of the present disclosure are directed to a mounting system 100. Such a mounting system 100 may include at least one "C" channel 200 adapted to be mounted to a surface 300, wherein the surface 300 may comprise, for example, an outward surface of a watercraft. In some particular instances, the surface 300 may comprise, for example, an outer surface of a molded polymeric kayak hull. The at least one "C" channel 200 is generally mounted to the surface 300 with the opening 250 in the "C" channel 200 directed or otherwise oriented outwardly of the surface 300. In some instances, the "C" channel 200 may be particularly configured to directly receive a mountable accessory device 400 via, for example, a mounting component 450 such as a Mighty Mount or Ram Ball mount. The mounting component 450 may be further engaged with an accessory 500 such as, for example, a rod holder, camera receiver, paddle holder, camera pole, light pole, etc. (as well as, for example, a cleat or other device for securing sails or anchors), as will be understood by one skilled in the art.

As shown in FIG. 1C, prior art systems for securing the mountable accessory device 40 to the "C" channel 10 implement a stop plate 30 typically disposed within the "C" channel 10 and at least spanning the opening 20. The mounting component 60 is disposed generally opposite the stop plate 30 outside the "C" channel 10, and is also configured to at least span the opening 20. An engaging member 70 such as, for example, a threaded member, may be configured to engage both the stop plate 30 and the mounting component 60, and to extend through the opening 20 of the "C" channel 10 to engage the respective components. In such instances, the mounting component 60 may be rotated to proceed along the threaded engaging member 70 until the portions of the "C" channel 10 defining the opening 20 are compressed between the stop plate 30 and the mounting component 60. With such a configuration, however, the essentially "point contact" or "point load" (i.e., a relatively large force acting on a relatively small surface area) engagement of the mounting component 60 with the "C" channel 10 may result in a relatively large torque or moment acting on the "C" channel 10 due to the configuration of the accessory 80 and/or the function thereof during use. For example, in instances where the accessory 80 comprises a rod holder used to hold a fishing rod for trolling, the act of a fish being hooked on a line extending from the fishing rod (normally on the order of between 6 and 8 feet long) may, in turn, exert a torque on the rod holder, via the fishing rod, wherein the resistance to the torque is placed solely upon the "point contact" formed between the stop plate 30/mounting component 60/engaging member 70, and the portions of the "C" channel 10 defining the opening 20. The "C" channel 10 itself may be formed of, for example, plastic, aluminum, or thin metal, and, as such, may not necessarily be sufficiently robust to withstand the torque or other forces imparted thereto via the accessory 80.

Figure 2A:
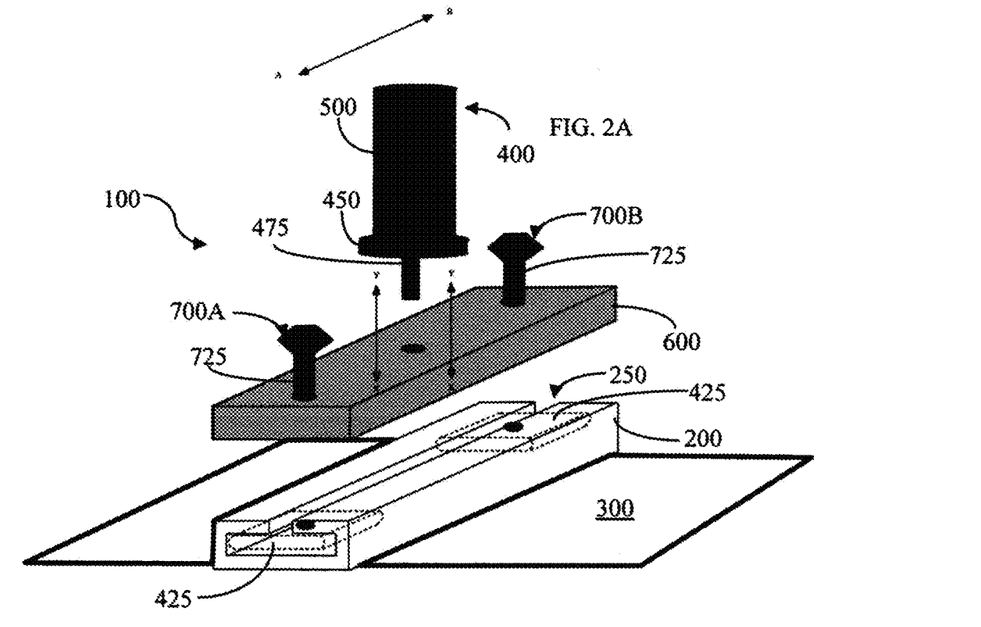
FIGS. 2A-2D schematically illustrate perspective views of a mounting system for an accessory device, according to one aspect of the present disclosure.

Accordingly, in some aspects as shown, for example, in FIG. 2A, the mounting system 100 may comprise an intermediary mounting member 600 disposed between the at least one "C" channel 200 and the accessory device 400. In such instances, the intermediary mounting member 600 may have the accessory device 400 mounted thereto, such that the intermediary mounting member 600 is disposed between the accessory device 400 and the at least one "C" channel 200. In engaging the accessory device 400 with the intermediary mounting member 600, the threaded engaging member 475 may be engaged with the intermediary mounting member 600 (i.e., threadedly engaged with the intermediary mounting member 600 itself, or extending through the intermediary mounting member 600 to engage a stop plate (not shown)), and arranged to receive the accessory device 400. In other instances, the threaded engaging member 475 may be carried by the accessory device 400, and otherwise configured for the threaded engaging member 475 to threadedly engage the intermediary mounting member 600 itself, or for the threaded engaging member 475 to extend through the intermediary mounting member 600 to engage a stop plate (not shown).

In turn, at least two mounting arrangements 700A, 700B may each be engaged between one of the at least one "C" channel 200 and the intermediary mounting member 600, wherein the mounting arrangements 700A, 700B may be arranged in spaced-apart relation along the at least one "C" channel 200. That is, at least one of the mounting arrangements 700A, 700B may comprise a stop plate 425 disposed within the "C" channel 200 and at least spanning the opening 250. A portion of the intermediary mounting member 600 is configured to be disposed generally opposite the stop plate 425 outside the "C" channel 200, and to at least span the opening 250. An engaging member 725 such as, for example, a threaded member, may be configured to engage both the stop plate 425 and the intermediary mounting member 600, and to extend through the opening 250 of the "C" channel 200 to engage the respective components. In such instances, the threaded engaging members 725 may be rotated until the portions of the "C" channel 200 defining the opening 250 are compressed between the stop plate 425 and the intermediary mounting member 600. In some instances, the threaded engaging member 725 may comprise, for example, a thumb screw, configured to extend through the intermediary mounting member 600 and the opening 250 in the "C" channel 200 to engage the stop plate 425 disposed within the "C" channel 200. The other of the at least two mounting arrangements 700A, 700B may be similarly configured such that the intermediary mounting member 600 may be securely attached to at least one "C" channel 200 at two or more spaced-apart points. In other instances, the other of the at least two mounting arrangements 700A, 700B may comprise a stop plate 425 fixedly secured to the intermediary mounting member 600 via the engaging member 725, wherein the distance between the stop plate 425 and the intermediary mounting member 600 is fixed (i.e., the stop plate 425 is capable of being inserted into one longitudinal end of the at least one "C" channel 200, and is capable of sliding along the "C" channel, but cannot be "tightened" for secure fitment), wherein the first of the at least two mounting arrangements 700A, 700B may then be tightened or otherwise secured to thereby secure the intermediary mounting member 600 to the "C" channel 200. One skilled in the art will appreciate, however, that more than two mounting arrangements may be utilized to secure the intermediary mounting member 600 to the at least one "C" channel where necessary or desired.

In some aspects, the at least one "C" channel 200 may comprise a single "C" channel 200. In such instances, each of the at least two mounting arrangements 700A, 700B may be engaged between the intermediary mounting member 600 and the same "C" channel 200. However, in other instances, as shown, for example, in FIGS. 2C and 2D, the at least one "C" channel 200 may comprise two "C" channels 200, and each of the at least two mounting arrangements 700A, 700B may be engaged between the intermediary mounting member 600 and a different one of the two "C" channels 200 (i.e., in instances of two mounting arrangements, one may be engaged between the intermediary mounting member and one "C" channel, while the other may be engaged between the intermediary mounting member and another one of the "C" channels, wherein the "C" channels may be in abutting or spaced apart relation).

Figure 2B:
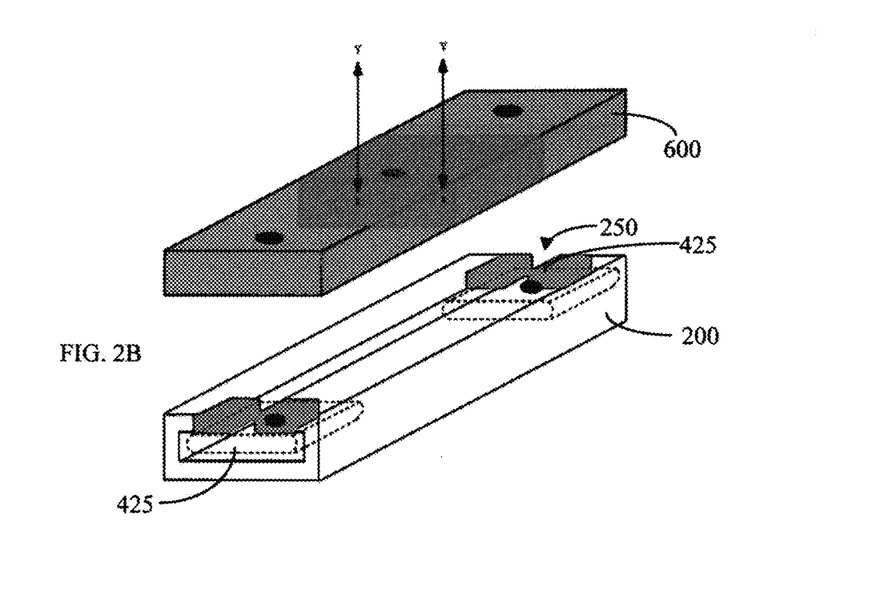
Figure 2C:
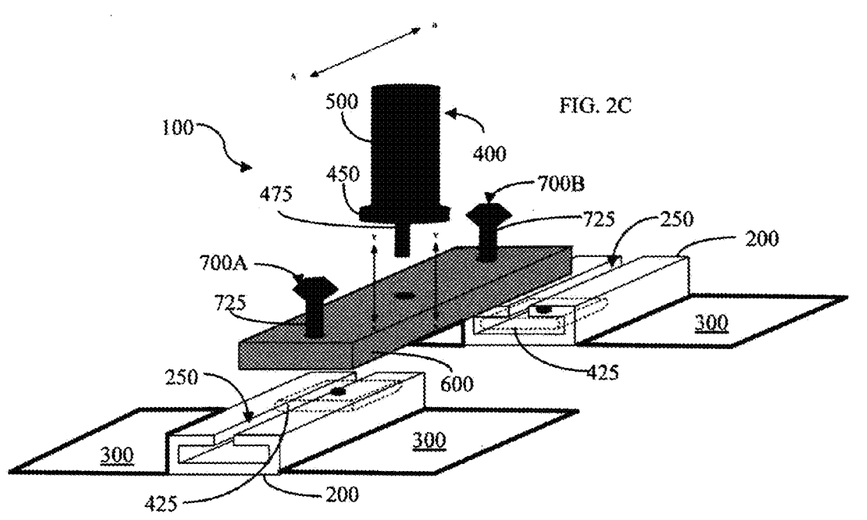
Figure 2D:
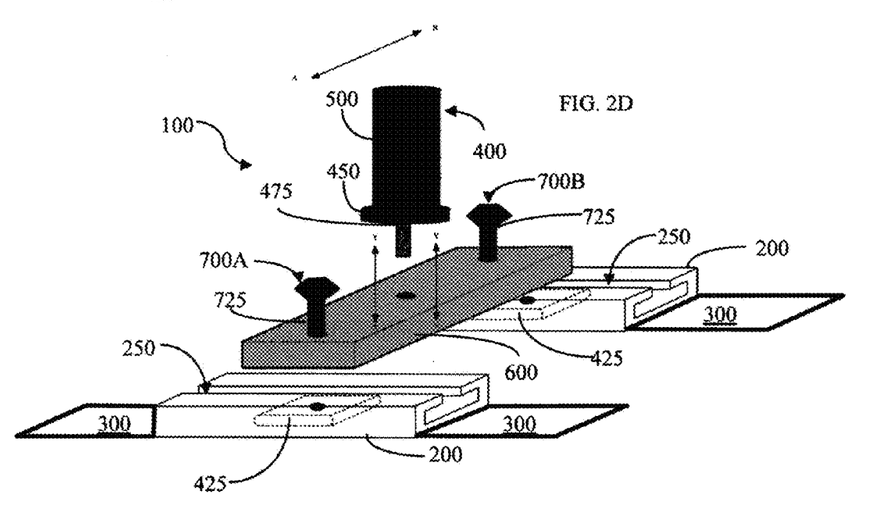

According to aspects of the present disclosure, as shown, for example, in FIG. 2B, mounting the intermediary mounting member 600 to the at least one "C" channel 200, and then mounting the accessory device 400 to the intermediary mounting member 600, may facilitate certain advantages. In one instance, the forces, moments, and/or torques imparted to the accessory device 400 during operation are now applied to the intermediary mounting member 600, for example, by way of a secure (i.e., nut and bolt type securement, using backing plates where necessary) mounting arrangement. The intermediary mounting member 600 can be further configured to be made from a robust material capable of withstanding these forces, moments, and/or torques. For example, the intermediary mounting member 600 may be comprised of a polymeric material such as "Starboard" type plastic sheet material, or a metal material such as aluminum. One skilled in the art will appreciate, however, that the intermediary mounting member 600 may be configured in other manners to provide the necessary robustness for the application herein. For example, the intermediary mounting member 600 may include longitudinally-extending ribs or other reinforcement provisions to provide the desired stiffness or resistance to bending or other distortion or deformation, while desirably maintaining minimal weight and a low profile. The forces, moments, and torques applied to the intermediary mounting member 600 are further dissipated, dispersed, or otherwise reduced in "point load" magnitude via the implementation of the mounting arrangements 700A, 700B and the engagements thereof with the at least one "C" channel 200. That is, the forces, moments, and/or torques applied via "point loads" to the at least one "C" channel 200 itself is at least halved due to the use of at least two mounting arrangements 700A, 700B. Accordingly, the risk of damage to the at least one "C" channel is lessened. Moreover, since the mounting arrangements 700A, 700B can be loosened/tightened, or otherwise be moved or repositioned along the at least one "C" channel to the desired position, the flexibility of this type of customizable mounting system utilizing the at least one "C" channel (rail) system is preserved.

In some aspects, it may be preferred that the accessory device 400 be mounted to the intermediary mounting member 600 between the two outermost mounting arrangements 700A, 700B. However, in other instances, it may be desirable or otherwise suitable for the accessory device 400 to be mounted to the intermediary mounting member 600 outside or beyond the two outermost mounting arrangements 700A, 700B. In still other instances, various other accessories may be mounted to the intermediary mounting member 600 in addition to or instead of the noted accessory devices 400. For example, a loop, cleat, or other fastening provision may be mounted to the intermediary mounting member 600. Such a fastening provision may be suitable for receiving a fastening strap, a safety strap, or the like for securely tethering the accessory device 400, or further items received by the accessory device 400, to the vessel by way of the intermediary mounting member 600. In one particular instance, a tether may extend between the fastening provision and a distal end (i.e., the end away from the intermediary mounting member 600) of a rod holder as the accessory device 400. In this manner, the tether may serve to counteract at least some of the forces moments, and/or torques that may be applied to the rod holder during operation of the vessel. In other instances, the fastening provision may be used, for example, to secure sails, anchors, or other items to the vessel.

Figure 3A:
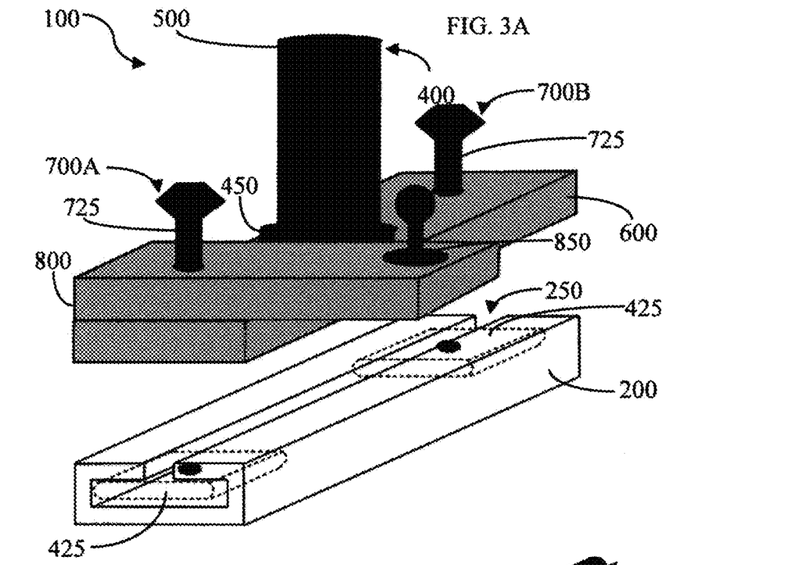
FIGS. 3A and 3B schematically illustrate perspective views of a mounting system for an accessory device, according to another aspect of the present disclosure.
Figure 3B:
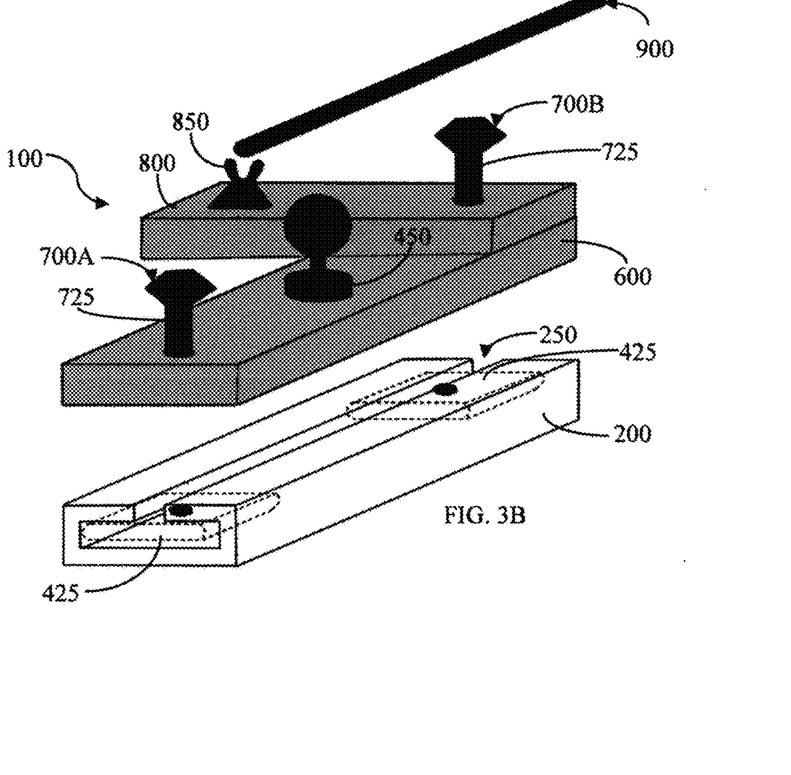

In still other aspects, as shown, for example, in FIGS. 3A and 3B, there may be instances in which it may be desirable to secure or mount an item to the intermediary mounting member 600 in a position laterally removed from the longitudinal axis of the intermediary mounting member 600. For example, there may be instances in which it may be desirable to secure a kayak paddle, gaff, anchoring pole, or other elongate member (see, e.g., element 900 in FIG. 3B) to the vessel, along one side thereof, wherein the elongate member 900 must also clear the accessory device 400 mounted to the intermediary mounting member 600. In such instances, a supplemental mounting member 800 may be provided and mounted to the intermediary mounting member 600, for instance, by the threaded connector 725 used to secure the intermediary mounting member 600 to the at least one "C" channel 200, or a separate connector assembly (not shown). In some instances, the supplemental mounting member 800 may be rotatable/pivotable about the threaded connector 725 and secured in a desired angular position with respect to the intermediary mounting member 600 by loosening/tightening the threaded connector 725. An appropriate fastening provision 850 (or other accessory device) may be mounted to the supplemental mounting member 800, removed or otherwise spaced apart from the threaded connector 725 so as to utilize the advantages provided by the variable angular positioning of the supplemental mounting member 800.

Figure 4A:
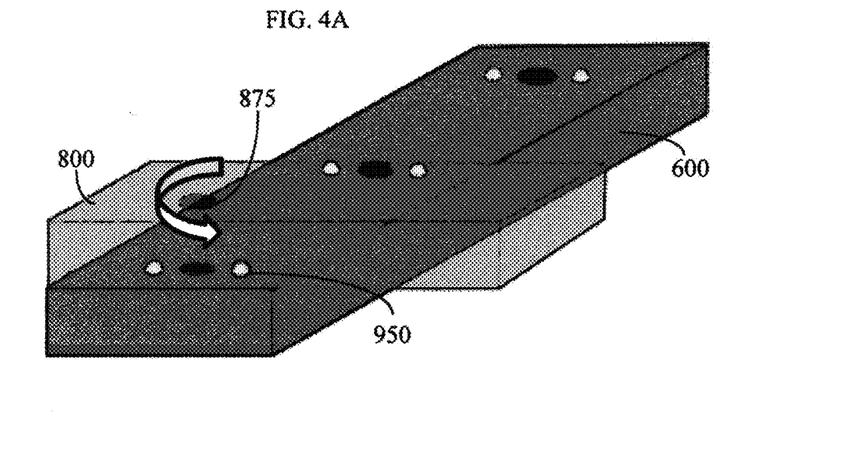
FIGS. 4A-4C schematically illustrate various views of a mounting system for an accessory device, according to yet another aspect of the present disclosure.
Figure 4B:
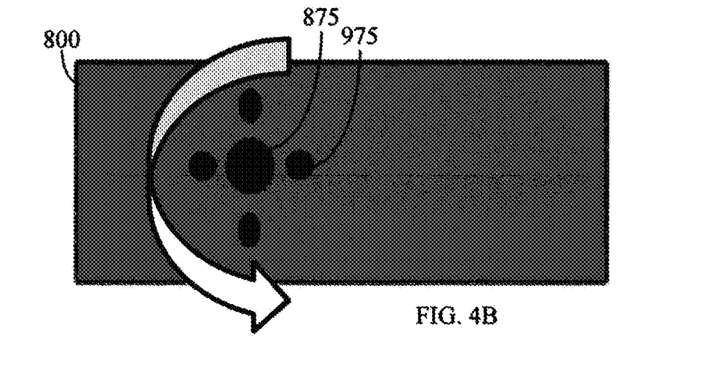
Figure 4C:
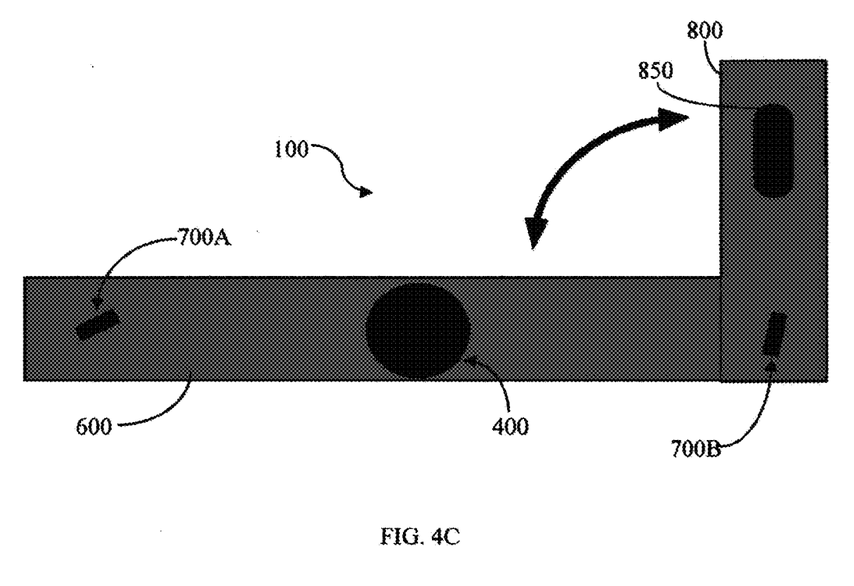

In some instances, the supplemental mounting member 800 may be configured to be co-operable with the intermediary mounting member 600 such that the supplemental mounting member 800 can be positively positioned at one or more predetermined angular positions, as shown, for example, in FIGS. 4A-4C. For example, in proximity to through-hole 875 for the threaded connector 725, one of the supplemental mounting member 800 and the intermediary mounting member 600 may be provided with one or more protrusions 950 direct toward the other of the supplemental mounting member 800 and the intermediary mounting member 600. The other of the supplemental mounting member 800 and the intermediary mounting member 600 may be provided with one or more corresponding recesses 975 configured to at least partially receive the protrusion 975. For example, as shown in FIG. 4B, four recesses 975 may be provided and equidistantly spaced about the through-hole 875 for the threaded connector 725 such that interaction of any one of the recesses 975 with the protrusion 950 causes the supplemental mounting member 800 to be positioned at any one of 0, 90, 180, and 270 degrees with respect the intermediary mounting member 600, in this example. Once the supplemental mounting member 800 is in the desired angular position, the threaded connector 725 may then be tightened to retain the supplemental mounting member 800 in the desired position.

Many modifications and other embodiments of the inventions set forth herein will come to mind to one skilled in the art to which these disclosed embodiments pertain having the benefit of the teachings presented in the foregoing descriptions and the associated drawings. For example, some aspects of the present disclosure may be directed to apparatus for use with a mounting system including at least one "C" channel adapted to be mounted to a surface and an accessory device mountable to the at least one "C" channel. In such aspects, the apparatus may comprise a mounting member configured to be arranged between the at least one "C" channel and the accessory device, wherein the mounting member is further configured to receive and have the accessory device mounted thereto; and at least two mounting arrangements, wherein each mounting arrangement may be configured to be engaged between one of the at least one "C" channel and the mounting member, and wherein the mounting arrangements may be arranged in spaced-apart relation along the at least one "C" channel. Other exemplary aspects may also be found, for instance, in the product brochure in the attached APPENDIX. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "I" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

That which is claimed:

1. A mounting system, comprising:
   at least one contiguous "C" channel having a primary portion opposed to an opening defined by opposed end portions, the primary portion being adapted to be mounted to a surface such that the opening is disposed opposite the primary portion from the surface;
   a mountable accessory device;
   an intermediary mounting member discrete from the accessory device and being disposed between the at least one "C" channel and the accessory device, the intermediary mounting member having the discrete accessory device removably mounted thereto;
   at least two discrete mounting arrangements, each mounting arrangement having a stop member disposed within one of the at least one "C" channel, each stop member being configured to individually engage a respective securing member engaged with the intermediary mounting member, and each securing member extending between the intermediary mounting member and the stop member through the opening of the at least one "C" channel, with the discrete accessory device being removably mounted to the intermediate mounting member between two of the at least two mounting arrangements; and
   a supplemental mounting member discrete from the intermediate mounting member and the accessory device and being removably mounted to the intermediary mounting member, the supplemental mounting member being configured to extend laterally to a longitudinal axis of the intermediary mounting member and to be pivotable with respect to the intermediary mounting member in a plane parallel to a plane of the intermediary mounting member.

2. The mounting system of claim 1, wherein the at least one "C" channel comprises a single "C" channel, and the mounting arrangements are arranged in longitudinally spaced-apart relation along the single "C" channel.

3. The mounting system of claim 1, wherein the at least one "C" channel comprises two "C" channels, one of the at least two mounting arrangements being disposed within each of the two "C" channels.

4. The mounting system of claim 1, wherein one of the supplemental mounting member and the intermediary mounting member comprises a protrusion, and the other of the supplemental mounting member and the intermediary mounting member comprises a recess corresponding to and configured to at least partially receive the protrusion, and wherein the at least partial reception of the protrusion by the recess causes the supplemental mounting member to be retained at a select angular position associated with the pivoting thereof with respect to the intermediary mounting member.

5. An apparatus for use with a mounting system including at least one contiguous "C" channel having a primary portion opposed to an opening defined by opposed end portions, the primary portion being adapted to be mounted to a surface such that the opening is disposed opposite the primary portion from the surface, and a discrete accessory device removably mountable to the at least one "C" channel, said apparatus comprising:
 a mounting member discrete from the accessory device and being configured to be arranged between the at least one "C" channel and the accessory device, the mounting member being further configured to receive and have the discrete accessory device removably mounted thereto;
 at least two discrete mounting arrangements, each mounting arrangement having a stop member configured to be disposed within one of the at least one "C" channel, each stop member being configured to individually engage a respective securing member engaged with the mounting member, and each securing member extending between the mounting member and the stop member through the opening of the at least one "C" channel, with the discrete accessory device being removably mounted to the mounting member between two of the at least two mounting arrangements; and
 a supplemental mounting member discrete from the mounting member and the accessory device, the supplemental mounting member being removably mounted to the mounting member and configured to extend laterally to a longitudinal axis of the mounting member and to be pivotable with respect to the mounting member in a plane parallel to a plane of the mounting member.

6. The apparatus of claim 5, wherein one of the supplemental mounting member and the mounting member comprises a protrusion, and the other of the supplemental mounting member and the mounting member comprises a recess corresponding to and configured to at least partially receive the protrusion, and wherein the at least partial reception of the protrusion by the recess causes the supplemental mounting member to be retained at a select angular position associated with the pivoting thereof with respect to the mounting member.

* * * * *